US012212346B2

United States Patent
Chakraborty et al.

(10) Patent No.: US 12,212,346 B2
(45) Date of Patent: Jan. 28, 2025

(54) PACKET PREAMBLE DETECTION USING DOPPLER SIGNATURE PATTERN

(71) Applicant: Microsoft Technology Licensing, LLC, Redmond, WA (US)

(72) Inventors: Tusher Chakraborty, Bellevue, WA (US); Ranveer Chandra, Kirkland, WA (US); Vaibhav Singh, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 18/155,663

(22) Filed: Jan. 17, 2023

(65) Prior Publication Data

US 2024/0243761 A1    Jul. 18, 2024

(51) Int. Cl.
*H04B 1/00* (2006.01)
*H04L 5/00* (2006.01)

(52) U.S. Cl.
CPC ......... *H04B 1/0003* (2013.01); *H04L 5/0048* (2013.01); *H04L 5/0078* (2013.01)

(58) Field of Classification Search
CPC .... H04B 1/0003; H04L 5/0048; H04L 5/0078
See application file for complete search history.

(56) References Cited

U.S. PATENT DOCUMENTS

2018/0241464 A1* 8/2018 Michaels ............ H04B 7/18539
2022/0039037 A1* 2/2022 Tian ..................... H04W 56/004

OTHER PUBLICATIONS

Farhangian, et al., "Multi-Constellation Software-Defined Receiver for Doppler Positioning with LEO Satellites", Sensors, vol. 20, Issue No. 20, Oct. 16, 2020, pp. 1-17.
International Search Report and Written Opinion received for PCT Application No. PCT/US2023/083711, Apr. 29, 2024, 15 pages.
"Telemetry / QUETZAL-1 Telemetry", Retrieved From: https://dashboard.satnogs.org/d/js5kQceWz/quetzal-1-telemetry?orgId=1, Apr. 28, 2020, 7 Pages.
"Welcome to SatNOGS Dashboard", Retrieved From: https://dashboard.satnogs.org/d/QjDe5S8mk/satellite-telemetries?orgId=1, Retrieved on: Aug. 30, 2022, 11 Pages.

* cited by examiner

*Primary Examiner* — David S Huang
(74) *Attorney, Agent, or Firm* — Alleman Hall & Tuttle LLP

(57) ABSTRACT

A ground station computing system for communicating with a satellite is provided, including a processor and associated memory storing instructions that cause the processor to execute a software-defined radio (SDR) program. The SDR program is configured to receive signals from a plurality of satellites and determine a doppler shift signature pattern of one of the satellites. The SDR program is further configured to detect, within the received signals from the plurality of satellites, packet preambles from the one of the plurality of satellites, based on correlations between portions of the received signals and the doppler shift signature pattern.

20 Claims, 13 Drawing Sheets

DOPPLER SHIFT FORMULA 60

$$f_o = \frac{v + v_o}{v + v_s} f_s$$

$f_o$: OBSERVER FREQUENCY OF SOUND $v$: SPEED OF SOUND WAVES $v_o$: OBSERVER VELOCITY $v_s$: SOURCE VELOCITY $f_s$: ACTUAL FREQUENCY OF SOUND WAVES

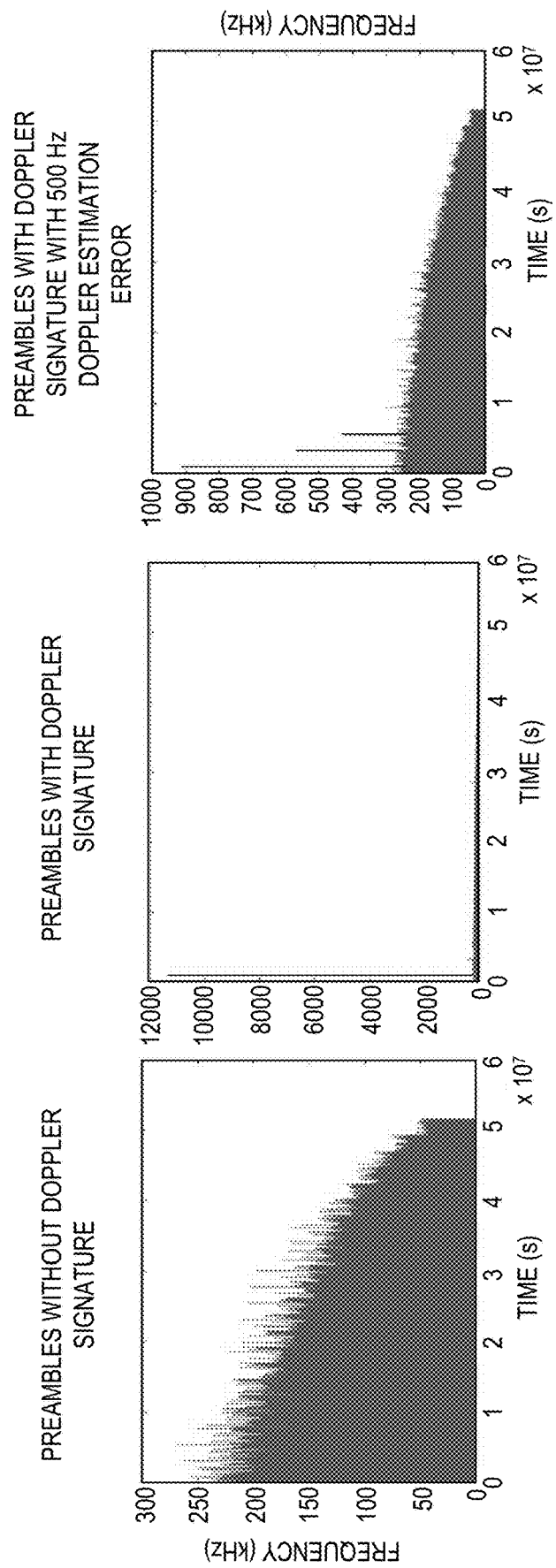

PACKET PREAMBLE DETECTION USING DOPPLER SIGNATURE PATTERN

BACKGROUND

The use of cube satellites, or CubeSats, has grown dramatically in recent years. A cube satellite is a miniaturized satellite which has a form factor of a cube with side lengths of 10 cm (3.9 in) and a mass of no more than 2 kg (4.4 lbs.) per unit. The cube satellite offers a low-cost, low-power, and small form-factor satellite. Along with the growing use of cube satellites, distributed computing systems that implement a Ground Station as a Service (GSaaS) have been developed. GSaaS include antenna locations around the world, along with cloud-based computer hardware and software that process signals received at each antenna location. A company wishing to deploy one or more satellites can utilize the services of a company offering GSaaS, thereby avoiding the need to independently build ground stations around the world. It will be appreciated that signals received at terrestrial antennas contain background radio frequency noise as well as signals from a multitude of satellites transmitting concurrently. A technical challenge exists for ground stations, including GSaaS, to efficiently identify a signal from an individual satellite and separate it from the background noise and signals of other satellites, in order to decode packetized data within that individual satellite signal.

SUMMARY

To address the issues discussed herein, a ground station computing system for communicating with a satellite is provided, including a processor and associated memory storing instructions that cause the processor to execute a software-defined radio (SDR) program. The SDR program is configured to receive signals from a plurality of satellites and determine a doppler shift signature pattern of one of the satellites. The SDR program is further configured to detect, within the received signals from the plurality of satellites, packet preambles from the one of the plurality of satellites, based on correlations between portions of the received signals and the doppler shift signature pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A, 6B, and 6C show computed correlations between simulated preamble transmission signals and received signals.

DETAILED DESCRIPTION

As briefly discussed above, Ground Station as a Service (GSaaS) is a type of cloud platform implemented service that has been developed to receive and process signals encoding data packets transmitted from cube satellites. At the service, a software-defined radio (SDR) program is used to receive and process cube satellite signals. However, processing the signals received from cube satellites is challenging since the signals are co-mingled with signals from other satellites and also with high-energy terrestrial noise. Identifying a target cube satellite signal is especially difficult because of the low transmission power and absence of a directional antenna capable of beamforming in cube satellites. In addition, to reduce the cost of implementing cube satellite networks, many ground station providers have built physical ground stations around the world that include low cost reception apparatus, and thus do not include large antennas that could improve reception. The inferior reception of these physical ground stations exacerbates the difficulty of isolating a signal from a target cube satellite in the presence of interfering signals and background noise.

Figure 1:
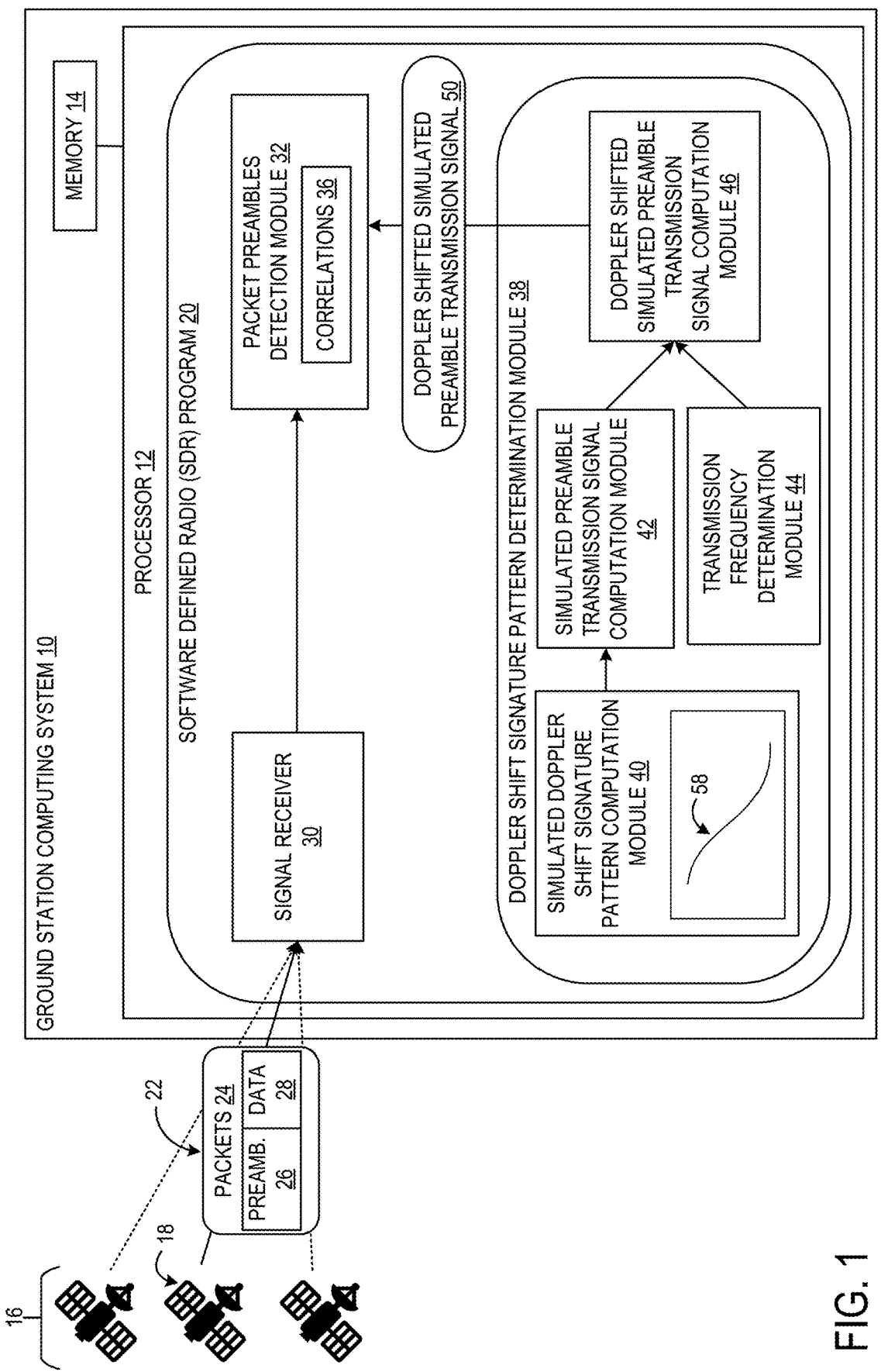
FIG. 1 shows a schematic diagram of an example ground station computing system for communicating with a satellite, according to one example implementation of the present disclosure.

As schematically illustrated in FIG. 1, to address the issues identified above, a ground station computing system 10 for communicating with a satellite is provided. As illustrated in FIG. 1, the ground station computing system 10 includes a processor 12 and associated memory 14 storing instructions that when executed by the processor cause the processor to perform the operations recited herein. For example, the computing system 10 may include a cloud server platform including a plurality of server devices, and the processor 12 may be one processor of a single server device, multiple processors of a single server device, or multiple processors distributed across multiple server devices. The computer system 10 may also include one or more client devices (such as client device 11 in FIG. 2) in communication with the server devices, and the processor 12 may be situated in such a client device. Below, the functions of computing system 10 will be described as being executed by the processor 12 by way of example, and this description shall be understood to include execution on one or more processors distributed among one or more of the devices discussed above.

Continuing with FIG. 1, the associated memory 14 may store instructions that cause the processor 12 to execute a software-defined radio (SDR) program 20. The SDR program 20 is configured to receive, via a signal receiver 30, signals 22 from a plurality of satellites 16 through physical antennas. The SDR program 20 is a software defined transceiver with complex embedded processing capabilities and a reconfigurable platform for changing radio parameters via software. A generic SDR is divided into three stages: a radio front-end (RFE), a digital back-end (DBE), and mixed signals interface (MSI). The RFE is composed of one or more receive (Rx) and transmit (Tx) channels, capable of working with signals in a wide tuning range of tens of gigahertz (GHz). The DBE handles signal processing, control, intelligence, data storage, and communication protocols. The DBE can utilize a field programmable gate array (FPGA) with an on-board DSP for modulation, demodulation, up-converting, down-converting, data packetization, and other application-specific tasks, such as security schemes or AI. The FPGA communicates with a host or network by packetizing data into Ethernet packets and sending them via SFP+/qSFP+ (Small Form Pluggable) links at a 10 to 100 Gbps transmission rate. Finally, the MSI is composed of dedicated digital-to-analog convertor (DAC) and analog-to-digital convertor (ADC) channels, which convert the signals from digital to analog and vice versa.

Figure 2:
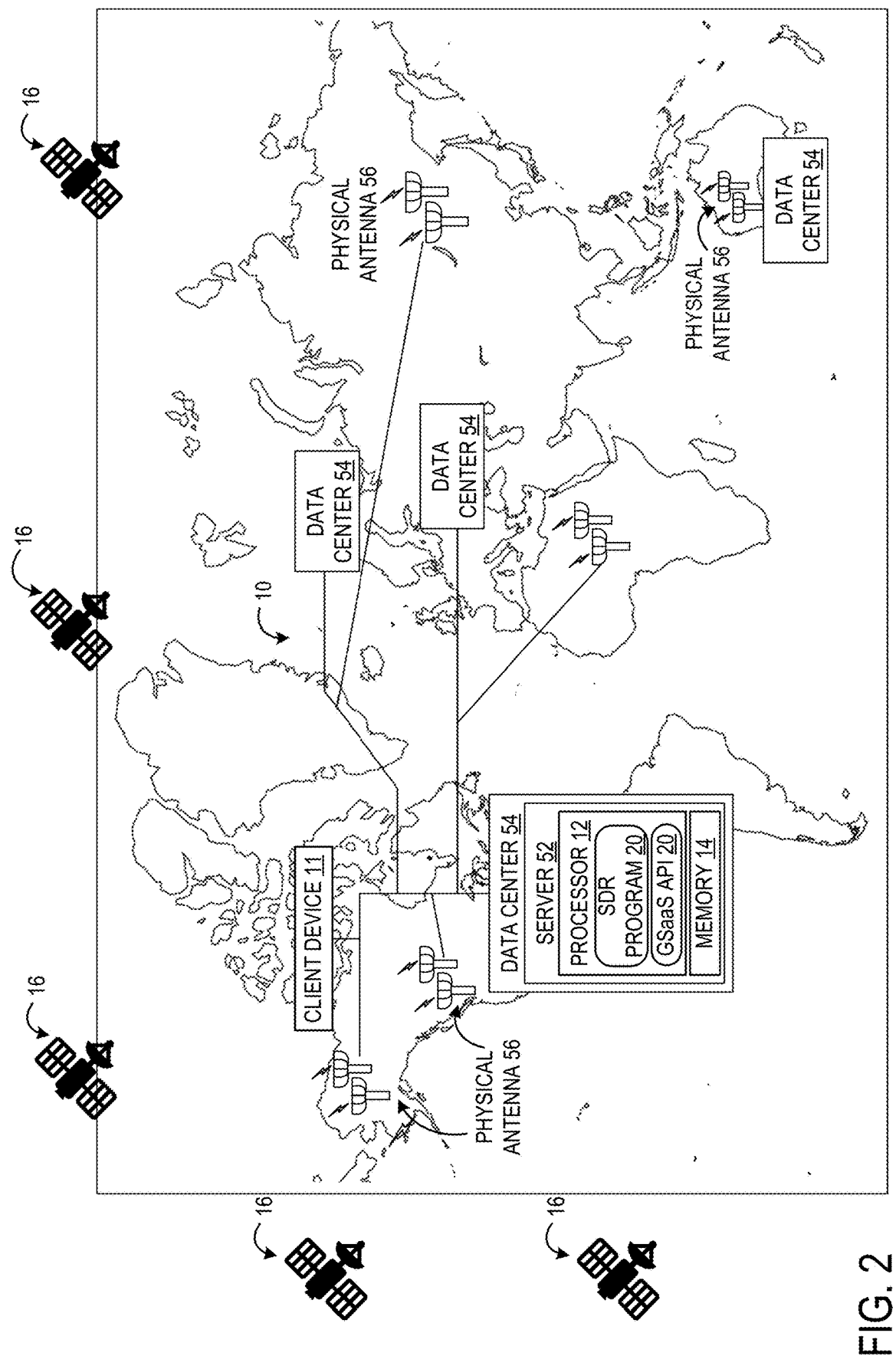
FIG. 2 illustrates example Ground Station as a Service (GSaaS) including physical antennas and data centers of the ground station computing system of FIG. 1 located around the world.

FIG. 2 illustrates example Ground Station as a Service (GSaaS) including physical antennas 56 and data centers 54 of the ground station computing system 10 of FIG. 1 located around the world. Ground stations offer "as a service" using SDRs and virtual machines to decrease the complexity of specialized hardware, offer general application-level support, and increase the accessibility of satellite operation for smaller companies and smaller satellite deployments. The GSaaS is a distributed computing system located at the data centers 54 of the ground station computing system 10, around the word. The physical antennas 56 for the GSaaS are positioned in fixed locations around the world, and raw signals received at those antennas 56 can be forwarded to the ground station computing system 10 of the data centers 54 for SDR processing. Alternatively, the data center 54 and processor 12 may be located near the antennas so as to be connectable by a high speed Local Area Network (LAN) connection, and the SDR processing of the raw signals can occur locally. Instead of developing their own proprietary ground stations around the world with both antennas and signal processing hardware independently, companies may use GSaaS to obtain command, control, and data linkages to a fleet of satellites. This allows businesses to experiment with multiple communications protocols utilizing a pay-as-you-go consumption model, reducing development, maintenance, leasing, construction, and ongoing operational expenses for ground stations. Services like modulation and demodulation, bit synchronization, and forward error correction, which once required massive racks of specialist equipment, may be operated by accessing GSaaS in the cloud over the Internet.

Figure 3:
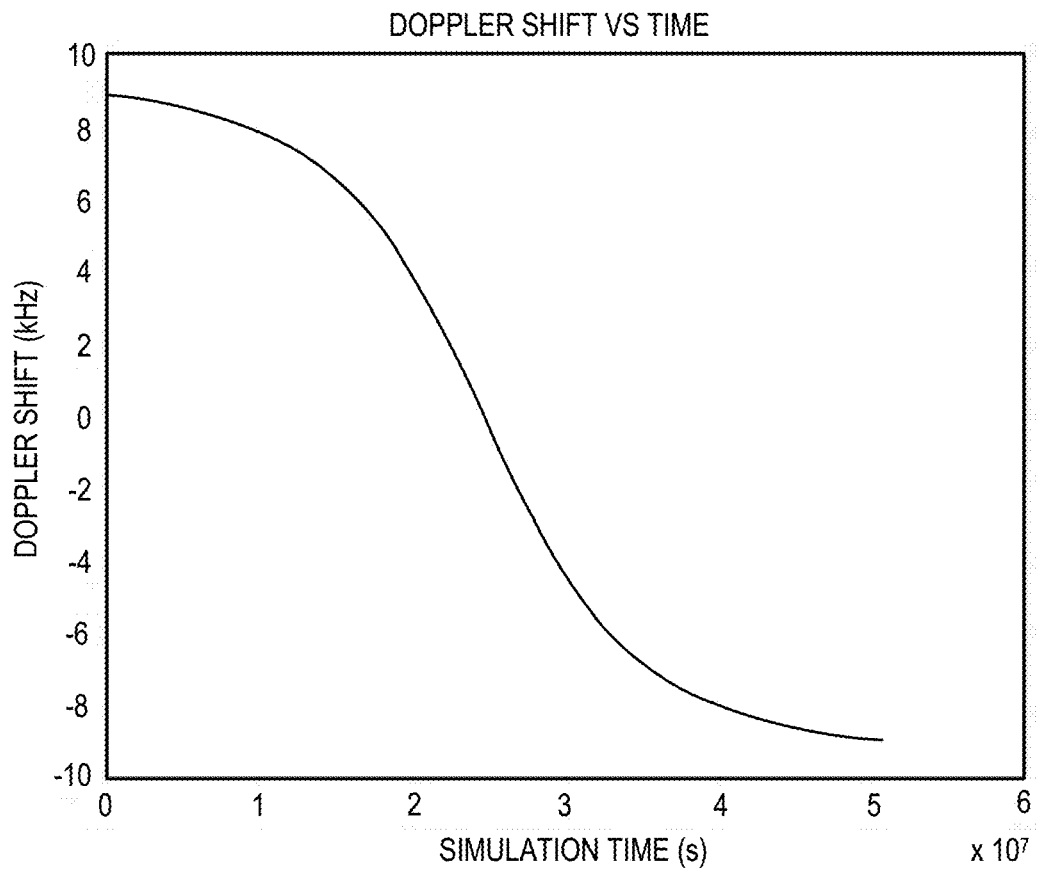
FIG. 3 illustrates an example doppler shift signature computed for a target satellite based on a relationship between an orbit of the target satellite and a location of the receiving antenna of the ground station computing system of FIG. 1.

Continuing with FIG. 1, the SDR program 20 is further configured to determine, via a doppler shift signature pattern determination module 38, a doppler shift signature pattern 58 of one of the satellites 16. Prior to receiving signals from the plurality of satellites 16, the processor 12 executing the SDR program is configured to compute a simulated doppler shift signature pattern for a target satellite 18 based upon a relationship between an orbit of the target satellite 18 and a location of the receiving antenna of the ground station computing system 10. Doppler shift is the change in frequency of a wave in relation to an observation point that is moving relative to the wave source. In this case, doppler shift in the signals transmitted from the satellites 16 is observed as the satellites 16 orbit the earth and move in relation to an antenna of the ground station computing system 10. Turning briefly to FIG. 3, an example doppler shift signature computed for the target satellite 18 based on a relationship between an orbit of the target satellite 18 and a location of the ground station computing system 10 of FIG. 1 is illustrated. As shown at FIG. 3, the doppler shift of the target satellite 18 is computed, using the doppler shift formula 60, based upon a relationship between an orbit of the target satellite 18 and a location of the ground station computing system 10.

Figure 4:
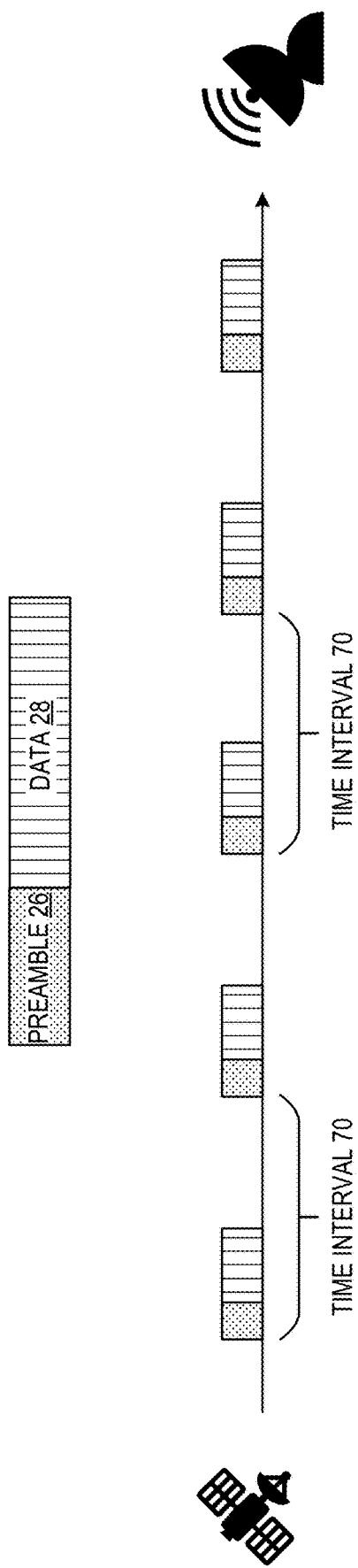
FIG. 4 illustrates example packets transmitted from each of the satellites to the ground station computing system of FIG. 1.

The processor 12 is further configured to generate a simulated preamble transmission signal for the target satellite 18, including a plurality of encoded preambles 26, via a simulated preamble transmission signal computation module 42. Each preamble 26 contains preamble information that identifies the target satellite 18. The processor 12 further is configured to determine a transmission frequency of simulated preamble transmission signal via a transmission frequency determination module 44. The signals 22 transmitted from the plurality of the satellites 16 include packets 24 that contains packet preambles 26 and data 28. FIG. 4 illustrates example packets 24 transmitted from each of the satellites 16 to the ground station computing system 10 of FIG. 1. The packets 24 including the encoded preambles 26 and data 28 are periodically transmitted from each of the satellites 16 to the ground station computing system 10 at a certain time interval 70, as shown at FIG. 4. Each packet preamble 26 contains preamble information that identifies the packet and target satellite 18. The frequencies and transmission time of the packet preambles 26, including a time interval 70 between packet preambles, are known in advance for the target satellite 18.

Figure 5A:
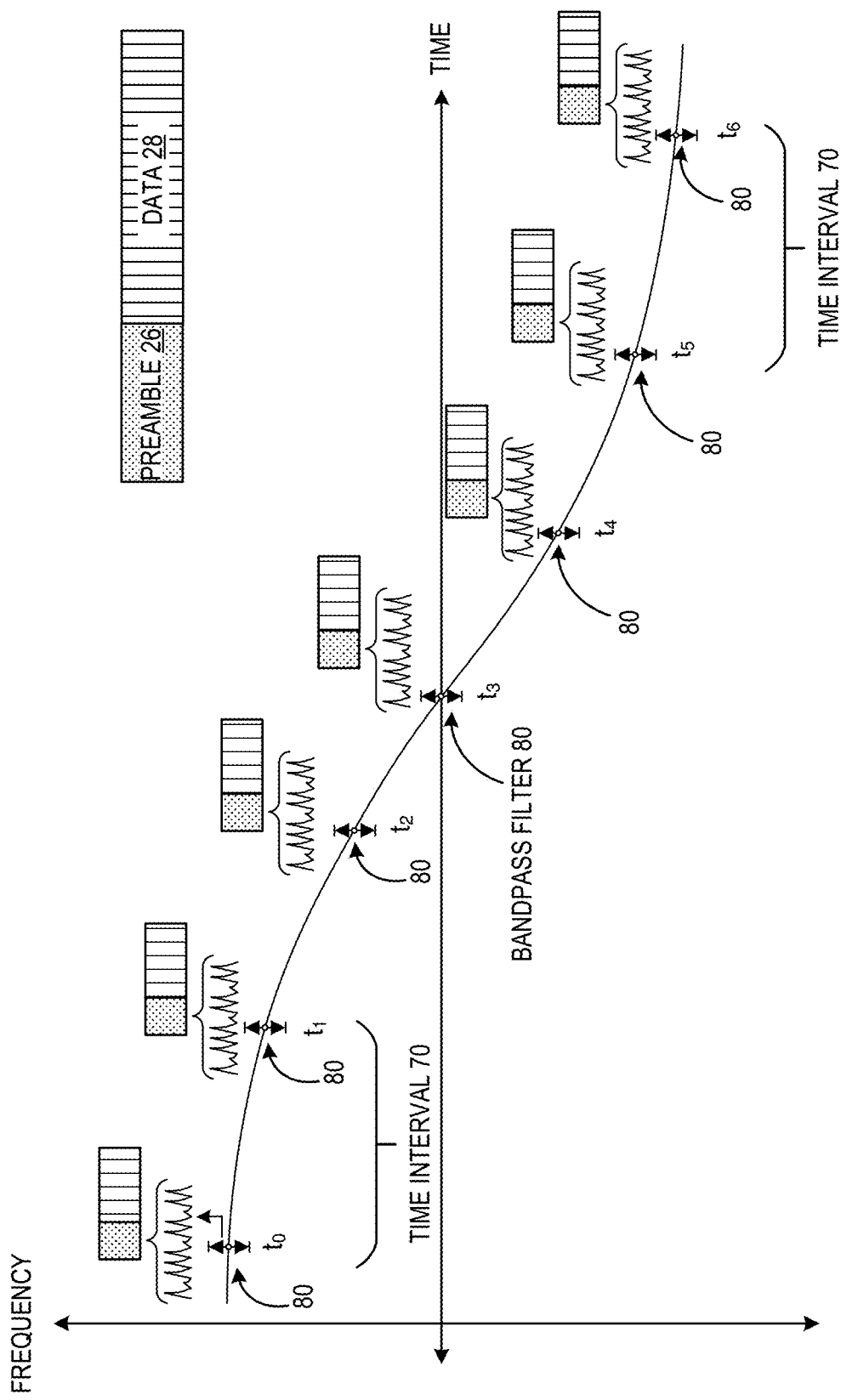
FIG. 5A illustrates an example doppler shifted simulated transmission signal received at the ground station computing system of FIG. 1.

FIG. 5A illustrates an example doppler shifted simulated transmission signal received at the ground station computing system 10 of FIG. 1 through the physical antennas. The SDR program 20 is further configured to set a bandpass filter 80 having a center frequency and a width determined based on the doppler shifted frequencies. The bandpass filter 80 is one of a plurality of bandpass filters at each of the doppler shifted frequencies, and the plurality of bandpass filters are separated by time intervals 70 along a doppler curve.

Figure 5B:
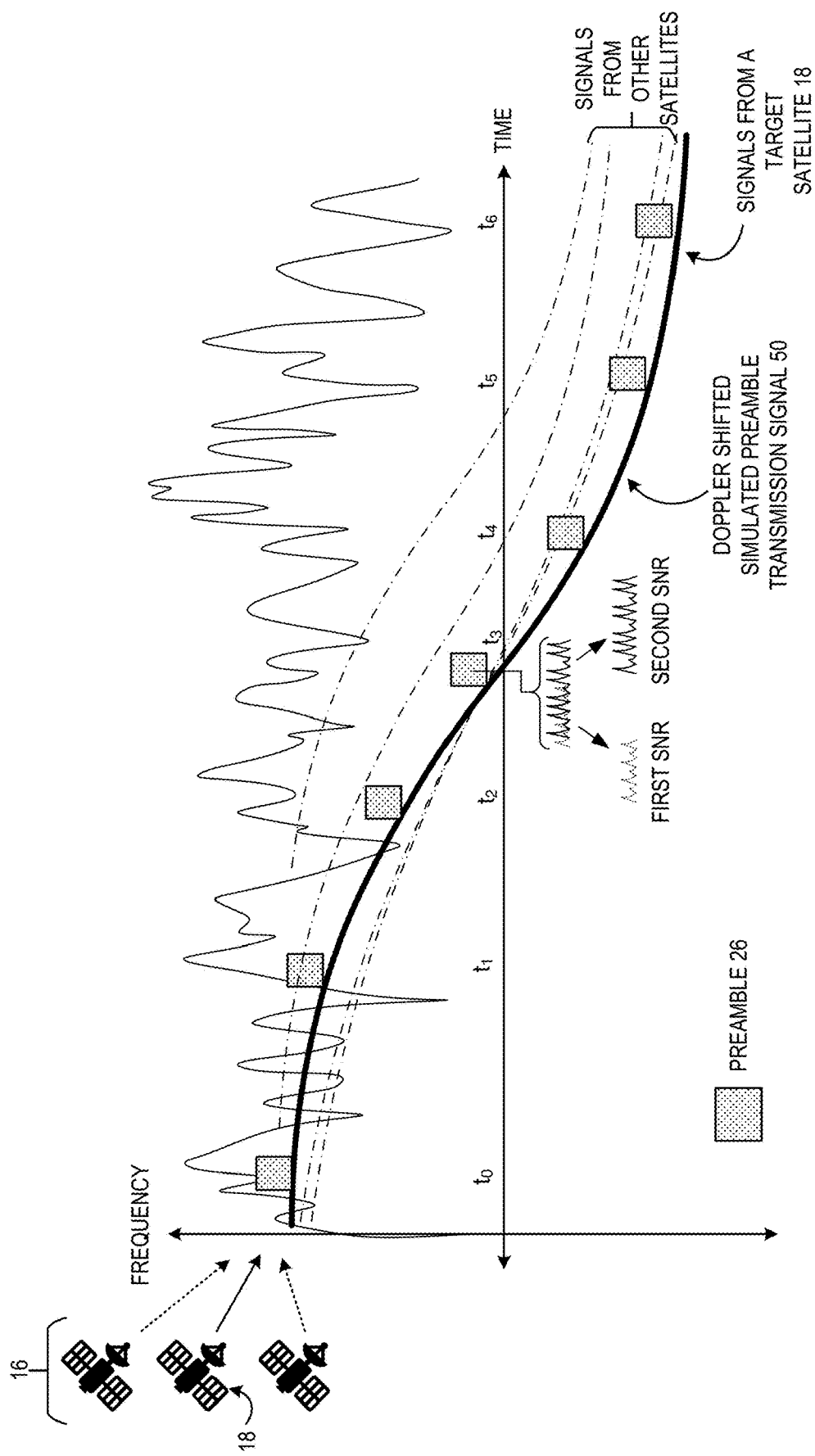
FIG. 5B illustrates an example doppler shifted simulated preamble transmission signal that is extracted from the doppler shifted simulated transmission signal of FIG. 5A.

FIG. 5B illustrates an example doppler shifted simulated preamble transmission signal that is extracted from the doppler shifted simulated transmission signal of FIG. 5A. The processor 12 is configured to compute a doppler shifted simulated preamble transmission signal 50, via doppler shifted simulated preamble transmission signal computation module 46 (see FIG. 1), based on the simulated doppler shift signature pattern, the determined frequency of the simulated preamble transmission signal, and a time interval 70 between packet preambles. The frequency of each preamble in the doppler shifted simulated preamble transmission signal is shifted by a different respective frequency shift amount based on the doppler shift signature pattern 58. The doppler shifted simulated preamble transmission signal 50 is obtained by extracting a plurality of the preambles 26 from the doppler shifted simulated transmission signal of FIG. 5A.

Continuing with FIG. 1, the SDR program 20 is further configured to detect, within the received signals 22 from the plurality of satellites 16, packet preambles 26 from the one of the plurality of satellites 16, based on correlations 36 between portions of the received signals 22 and the doppler shift signature pattern 58 via a packet preambles detection module 32. The packet preambles detection module 32 determines correlations 36 between the doppler shifted simulated preamble transmission signal 50 and frequencies of the received signals 22. FIGS. 6A, 6B, and 6C show computed correlations between simulated preamble transmission signals and received signals 22. FIG. 6A shows correlations of the preambles without the doppler signature pattern. As shown at FIG. 6A, no clear peaks are observed. FIG. 6B shows correlations of the preambles with the doppler signature pattern. As shown at FIG. 6B, a prominent peak for the first preamble is observed and the first preamble is detected. Once the first preamble is detected, the peak for the second preamble is obtained and the second preamble is thus detected. In turn, the same procedure can be applied for the rest of the preambles. FIG. 6C shows correlations of the preambles with the doppler signature pattern and 500 Hz doppler estimation error applied. As shown at FIG. 6C, a prominent peak for the first preamble is still observed, while there are some false alarms observed.

Figure 7:
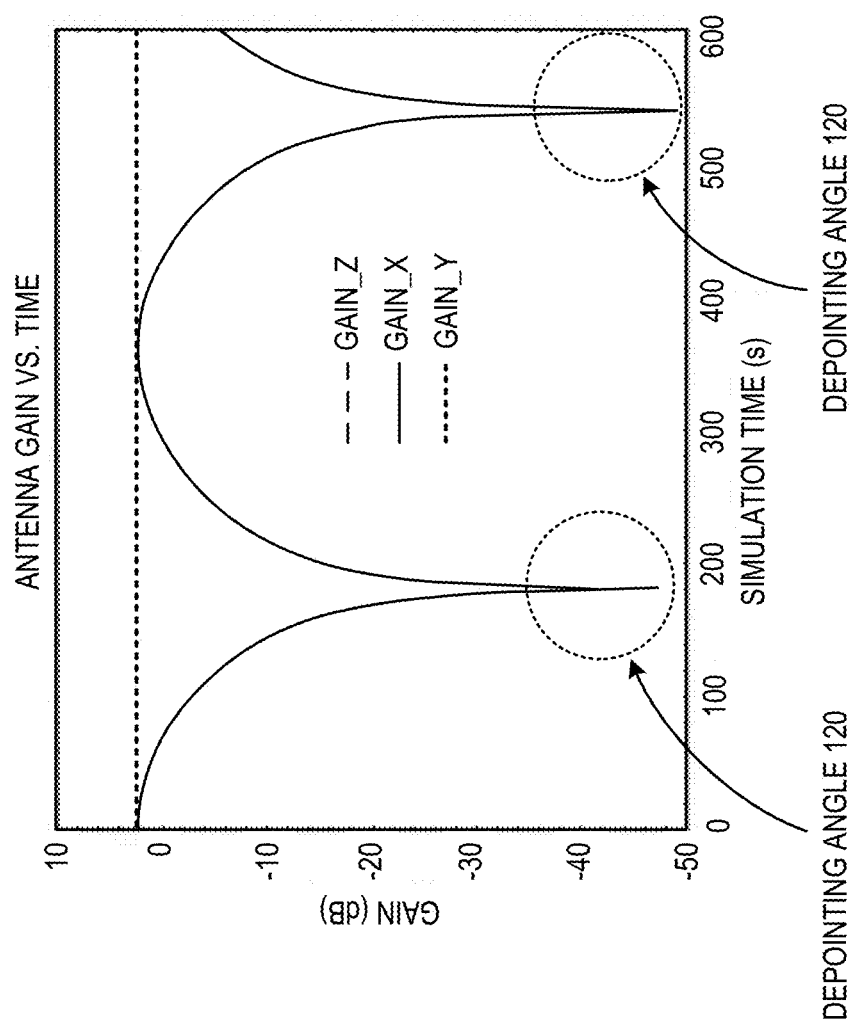
FIG. 7 illustrates antenna gain (dB) over time with depointing losses resulting from satellite tumbling.

FIG. 7 illustrates antenna gain (dB) over time with depointing losses resulting from a satellite tumbling through space during its orbit. Low-cost small satellites such as CubeSat do not stabilize but rotate on their own axes and tumble in space. Due to satellite tumbling, the antenna of the satellite does not point optimally towards the receiver of the ground station computing system 10 at all times. This results in a depointing loss or angle 120 shown in FIG. 7 for a toroidal pattern halfwave dipole antenna typically used in CubeSat missions. To improve the reception, the SDR program 20 is configured to read an orientation signal from an onboard orientation sensor such as a gyro sensor and inertial motion sensor and determine a depointing angle based on the orientation signal. The SDR program 20 is further configured to adjust a transmit power of a transmitter of the satellite based on the depointing angle. In other words, the transmit power of the transmitter of the satellite may be increased when the satellite antenna is in the depointing angle that is detected by the orientation sensor. Alternatively, the SDR 20 program is further configured to adjust modulation and coding parameters of the transmitter of the satellite based on the depointing angle.

Figure 8:
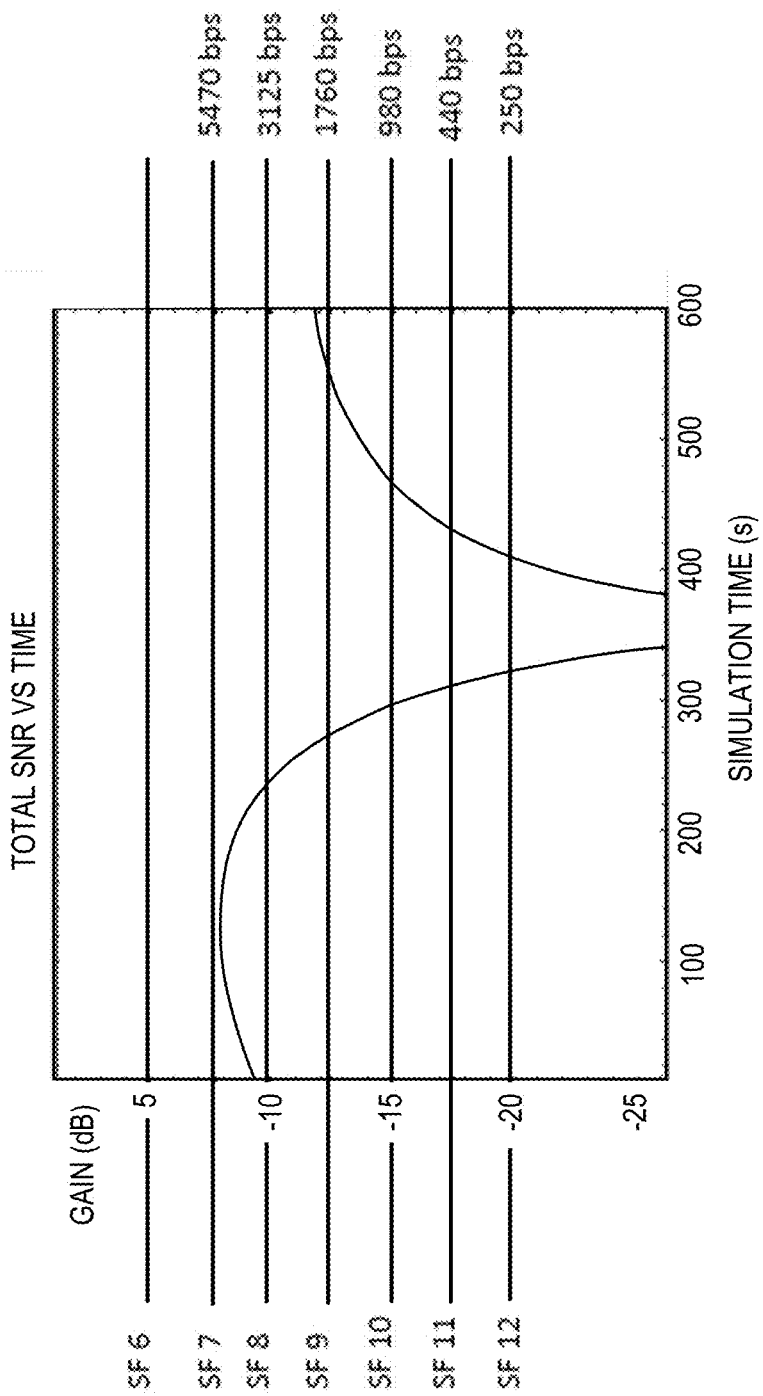
FIG. 8 illustrates different modulation rates applied to a transmission signal depending on the antenna gain (dB) over time.

FIG. 8 illustrates different modulation rates applied to a transmission signal depending on the antenna gain (dB) over time. As shown at FIG. 8, higher modulation and encoding parameters may be used when the satellite antenna is at or near the depointing angle, while lower modulation and coding parameters may be used when the satellite antenna is not at or near depointing angle. Although higher encoding would slow down signals, it does not result in signal loss. For instance, when a lower encoding rate of 3125 bps is used at SF8, a signal gain of over 10 dB can be achieved while achieving a relatively high transmission rate, thereby improving the signal to noise ratio. On the other hand, when the satellite antenna approaches the depointing angle, the gain drops to −20 dB, and accordingly, larger spreading factor such as SF12 and a slower communication rate, such as 250 bps, can be used to maintain communications.

Figure 9:
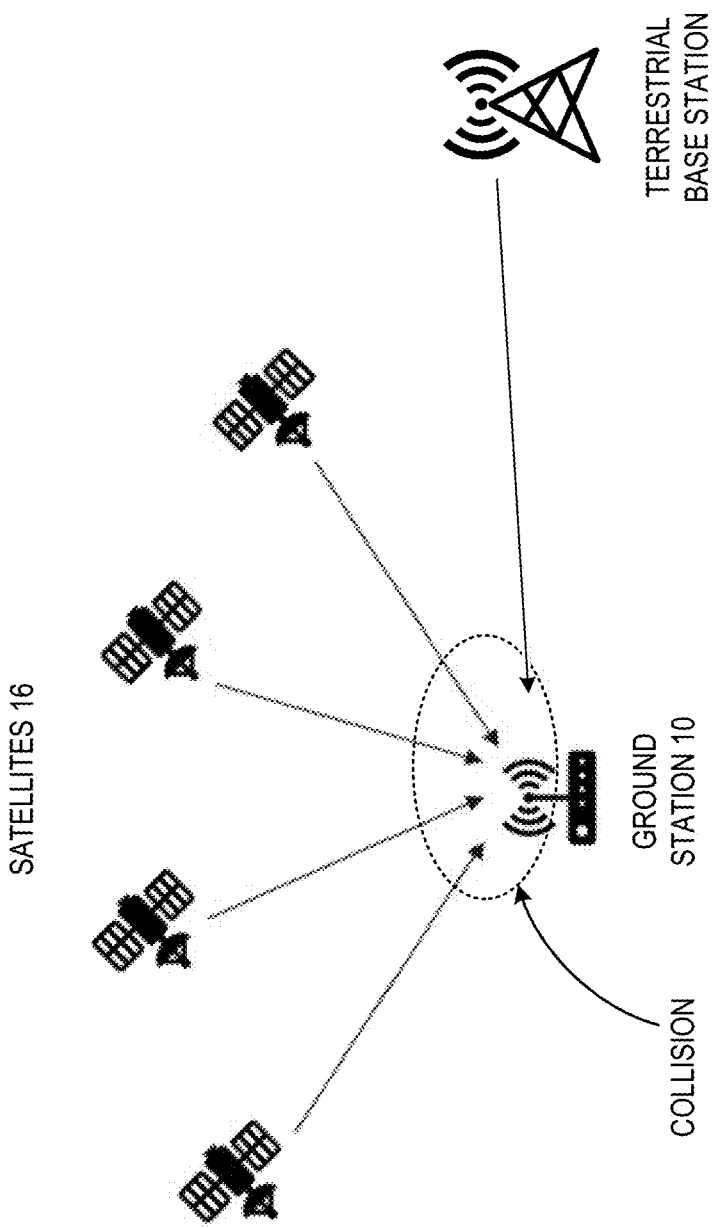
FIG. 9 illustrates signals encoding packets transmitted from a target satellite colliding with signals encoding packets transmitted from other satellites and signals from terrestrial sources at the ground station computing system of FIG. 1.

FIG. 9 illustrates packets transmitted from the target satellite 18 colliding with packets transmitted from other satellites and terrestrial sources at the ground station computing system 10 of FIG. 1. As shown in FIG. 9, packets transmitted from the target satellite 18 may collide with packets transmitted from other satellites and terrestrial sources such as a terrestrial base station. A collision may interfere with the process of decoding a packet because packets cannot be differentiated from one another and other packet signals may interfere with the packet signal from the target satellite 18. To mitigate these challenges, the ground station computing system 10 can differentiate packets from one another. To achieve this, the SDR program 20 is further configured to implement a doppler shift offset to resolve collision in packet signals during decoding. The SDR program 20 first decodes a preamble, that is, a series of constant signals that indicate the start of a packet. For example, in LoRa, a long-range data modulation protocol, the preamble consists of up-chirps wherein frequency increases over a certain range and duration. The preamble is decoded by applying a corresponding down-chirp to the up-chirp, wherein frequency decreases over the same range and duration as the up-chirp and nullifies the up-chirp to decode the signal. Due to the doppler shift, a decoded preamble is offset in frequency more than the original transmission by a distinct value. Thus, each preamble for a packet of data has distinct peak values in frequency, and since each preamble is correlated to a different packet, the SDR program 20 can differentiate packets from one another despite collisions using these peak value correlations.

Figure 10:
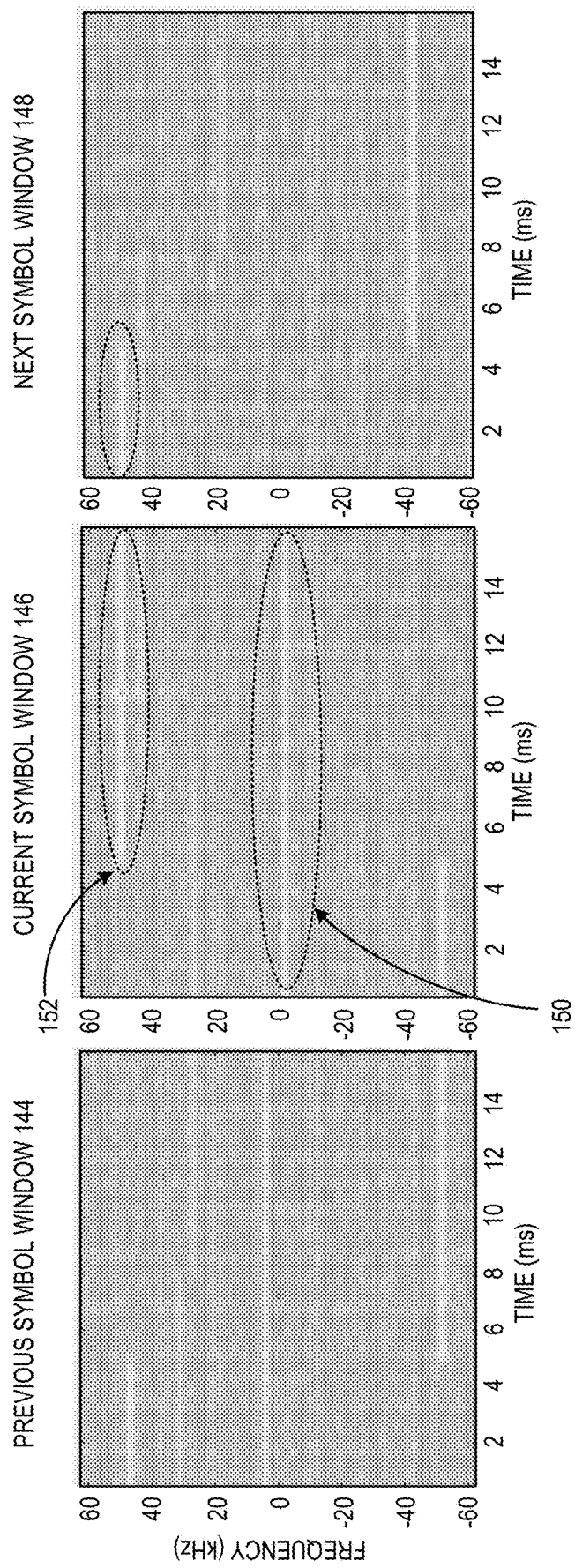
FIG. 10 shows a previous symbol window, current symbol window, and next symbol window containing all or a portion of symbols in the packet preambles.

FIG. 10 shows a previous symbol window 144, current symbol window 146, and next symbol window 148 of each packet preamble 26. During the process of decoding the packet from the target satellite 18, the SDR program 20 can mitigate the aforementioned interferences from other packets at the ground station computing system 10, by configuring the SDR program 20 to implement symbol window fitting to resolve collisions in packet signals during decoding. Each packet has a distinct symbol window, that is, a duration of each signal in the preamble. When the SDR program 20 selects the symbol window for the packet from the target satellite 18, the signal from the packet is continuous throughout the symbol window, as shown at 150 of FIG. 10. Meanwhile, a signal from other packets will be received at a different frequency due to the doppler shift, and this signal will be present for only part of the symbol window. Signals from other packets will further be present for part of a consecutive symbol window, as shown at 152 of FIG. 10. The SDR program 20 is configured to identify these signals that were transmitted from other satellites and terrestrial sources as interferences. To eliminate residual interferences, the SDR program 20 initially sets a high threshold for peak detection to identify visible peaks in frequency which indicate a distinct packet signal. Then, the SDR program 20 uses a low pass filter to make peaks more prominent, which allows it to identify residual packets that were missed due to the high threshold and ensures that residual signals from other packets are eliminated.

The SDR program 20 is further configured to implement signal to noise ratio (SNR) based grouping to resolve collisions in packet signals during decoding. When decoding packets in the presence of collisions, setting a high threshold for peak detection may cause other peaks to be missed, leading to incorrect residual intersection. On the other hand, setting a low threshold for peak detection may cause harmonics creating false alarms. To address this issue, the SDR program 20 first sets a high threshold to identify visible peaks and then uses a low pass filter, which makes peaks more prominent and eliminates residual peaks. Furthermore, the SDR program 20 may compare the SNRs of the various identified peaks in the composite signals and group those peaks together that have a similar SNR as being from the same packet originating at the same satellite, to help disambiguate interfering signals. The SDR program 20 can filter out signal peaks with dissimilar SNRs. For example, the corresponding packets that do not have an SNR that is within a range of the SNR of the initial preamble detected from the target satellite signal can be filtered out and ignored by the SDR program 20 as noise.

Figure 11:
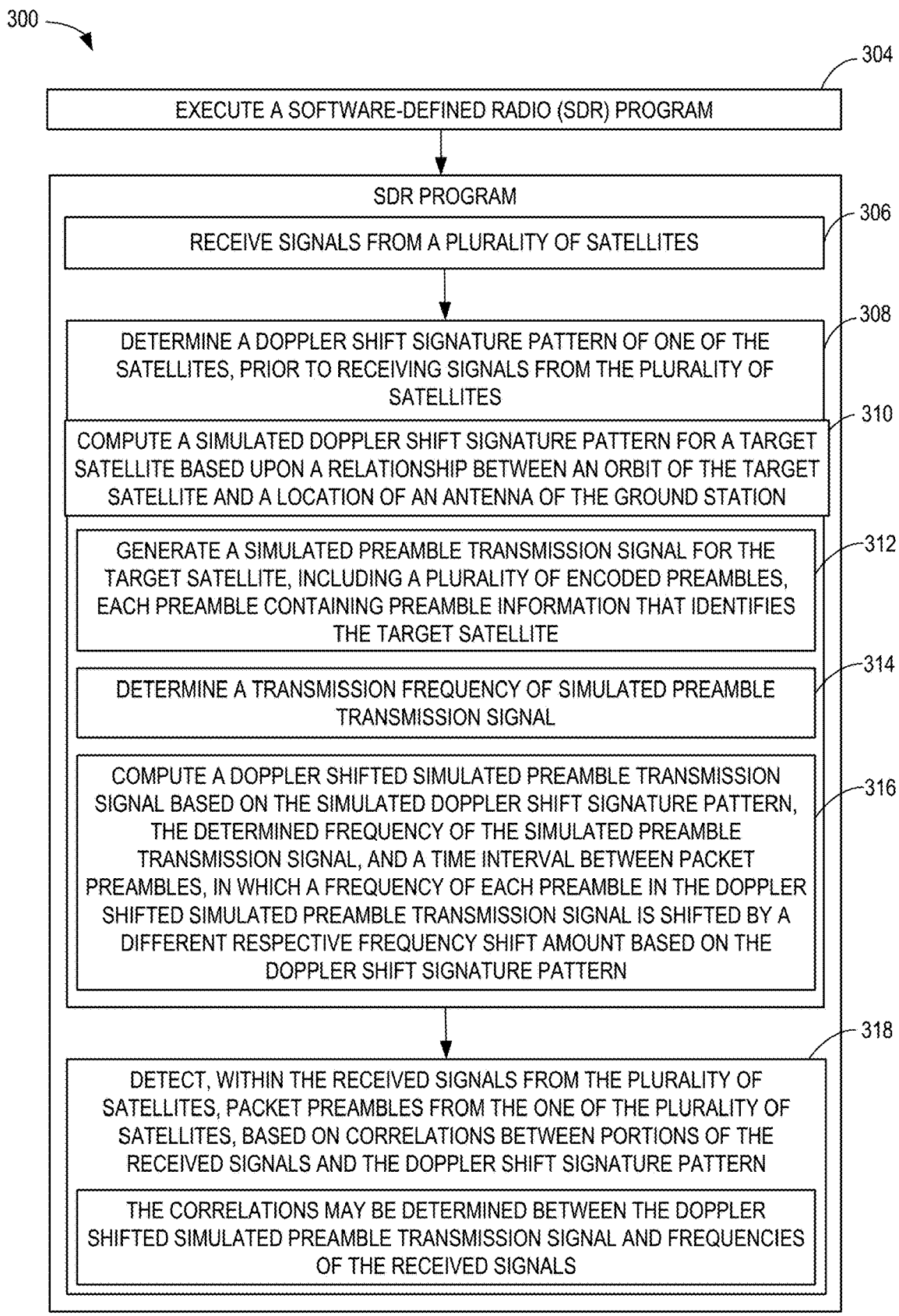
FIG. 11 shows a flowchart of a computerized method according to one example implementation present disclosure.

FIG. 11 shows a flowchart of a computerized method 300 according to one example implementation of the ground station computing system 10 of FIG. 1. At step 304, the method may include executing a software-defined radio (SDR) program. At step 306, the method may include, via the SDR program, receiving signals from a plurality of satellites. At step 308, the method may include determining a doppler shift signature pattern of one of the satellites, prior to receiving signals from the plurality of satellites. At step 310, the method may include computing a simulated doppler shift signature pattern for a target satellite based upon a relationship between an orbit of the target satellite and a location of an antenna of the ground station. At step 312, the method may include generating a simulated preamble transmission signal for the target satellite, including a plurality of encoded preambles, each preamble containing preamble information that identifies the target satellite. At step 314, the method may include determining a transmission frequency of simulated preamble transmission signal. At step 316, the method may include computing a doppler shifted simulated preamble transmission signal based on the simulated doppler shift signature pattern, the determined frequency of the simulated preamble transmission signal, and a time interval between packet preambles, in which a frequency of each preamble in the doppler shifted simulated preamble transmission signal is shifted by a different respective frequency shift amount based on the doppler shift signature pattern. At step 318, the method may include detecting, within the received signals from the plurality of satellites, packet preambles from the one of the plurality of satellites, based on correlations between portions of the received signals and the doppler shift signature pattern. The correlations may be determined between the doppler shifted simulated preamble transmission signal and frequencies of the received signals.

It will be appreciated that the above-described systems and methods have the potential technical benefit of providing accurate packet preamble detection with more prominent correlation outputs and isolating a signal from a target cube satellite effectively in the presence of interfering signals and background noise, by utilizing a doppler signature pattern to detect packet preambles transmitted from a target satellite and further adjusting a transmit power or modulation parameters of a transmitter of the satellite based on the depointing angle. The above-described systems and methods have further potential technical benefit of mitigating interferences from other packets transmitted from other satellites by implementing a doppler shift offset, symbol window fitting, and/or SNR based grouping to resolve collisions in packet signals during decoding.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
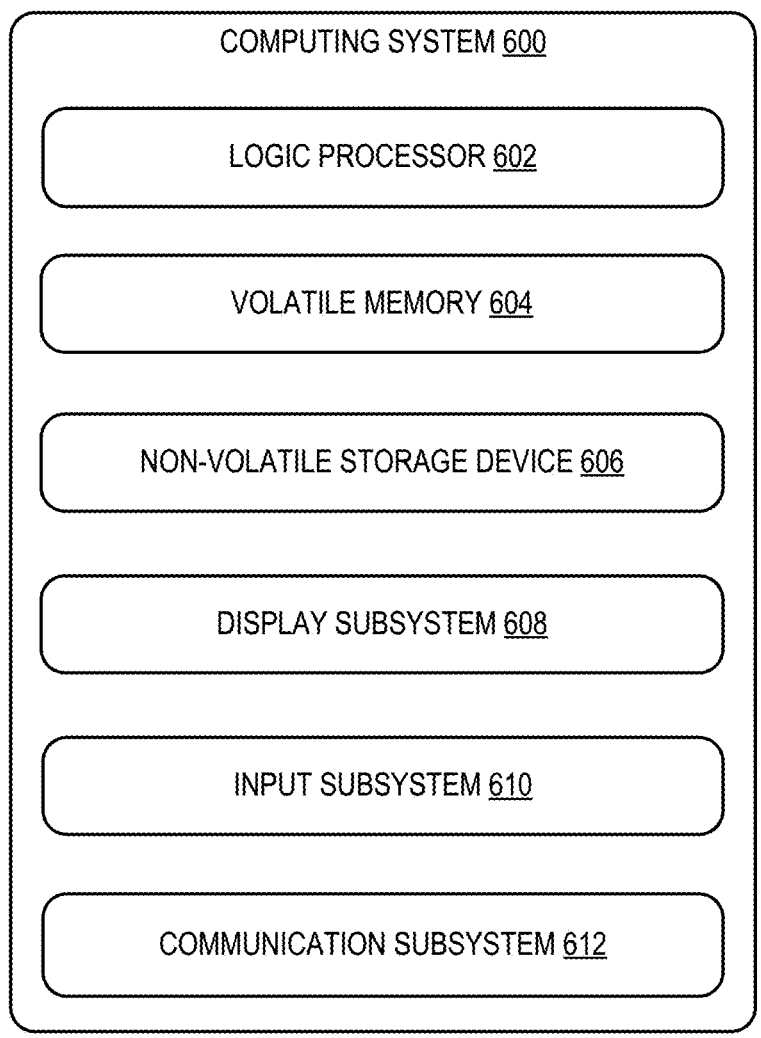
FIG. 12 shows a block diagram of an example computing system that may be utilized to implement the computing system of FIG. 1

FIG. 12 schematically shows a non-limiting embodiment of a computing system 600 that can enact one or more of the methods and processes described above. Computing system 600 is shown in simplified form. Computing system 600 may embody the computer device 10 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 12.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect of the present disclosure provides a ground station computing system for communicating with a satellite. The computing system may include a processor and associated memory storing instructions that cause the processor to execute a software-defined radio (SDR) program. The SDR program may be configured to receive signals from a plurality of satellites and determine a doppler shift signature pattern of one of the satellites. The SDR program may be further configured to detect, within the received signals from the plurality of satellites, packet preambles from the one of the plurality of satellites, based on correlations between portions of the received signals and the doppler shift signature pattern.

According to this aspect, prior to receiving signals from the plurality of satellites, the processor executing the SDR program may be further configured to compute a simulated doppler shift signature pattern for a target satellite based upon a relationship between an orbit of the target satellite and a location of an antenna of the ground station. The processor executing the SDR program may be further configured to generate a simulated preamble transmission signal for the target satellite, including a plurality of encoded preambles, each preamble containing preamble information that identifies the target satellite. The processor executing the SDR program may be further configured to determine a transmission frequency of simulated preamble transmission signal. The processor executing the SDR program may be further configured to compute a doppler shifted simulated preamble transmission signal based on the simulated doppler shift signature pattern, the determined frequency of the simulated preamble transmission signal, and a time interval between packet preambles, wherein a frequency of each preamble in the doppler shifted simulated preamble transmission signal is shifted by a different respective frequency shift amount based on the doppler shift signature pattern.

According to this aspect, the correlations may be determined between the doppler shifted simulated preamble transmission signal and frequencies of the received signals.

According to this aspect, the SDR program may be further configured to set a bandpass filter having a center frequency and a width determined based on the doppler shifted frequencies.

According to this aspect, the bandpass filter may be one of a plurality of bandpass filters at each of the doppler shifted frequencies, and the plurality of bandpass filters may be separated by time intervals along a doppler curve.

According to this aspect, the SDR program may be further configured to read an orientation signal from an onboard orientation sensor. The SDR program may be further configured to determine a depointing angle based on the orientation signal. The SDR program may be further configured to adjust a transmit power of a transmitter of the satellite based on the depointing angle.

According to this aspect, the SDR program may be further configured to read an orientation signal from an onboard orientation sensor. The SDR program may be further configured to determine a depointing angle based on the orientation signal. The SDR program may be further configured to adjust modulation and coding parameters of a transmitter of the satellite based on the depointing angle.

According to this aspect, the SDR program may be further configured to implement a doppler shift offset to resolve collision in packet signals during decoding.

According to this aspect, the SDR program may be further configured to implement signal to noise ratio (SNR) based grouping to resolve collisions in packet signals during decoding.

According to this aspect, the SDR program may be further configured to implement symbol window fitting to resolve collisions in packet signals during decoding.

According to another aspect of the present disclosure, a computerized method for communicating with a satellite is provided. According to this aspect, the computerized method may include executing a software-defined radio (SDR) program configured to receive signals from a plurality of satellites, determine a doppler shift signature pattern of one of the satellites, and detect, within the received signals from the plurality of satellites, packet preambles from the one of the plurality of satellites, based on correlations between portions of the received signals and the doppler shift signature pattern.

According to this aspect, the computerized method may further include, prior to receiving signals from the plurality of satellites, computing a simulated doppler shift signature pattern for a target satellite based upon a relationship between an orbit of the target satellite and a location of an antenna of the ground station. The computerized method may further include generating a simulated preamble transmission signal for the target satellite, including a plurality of encoded preambles, each preamble containing preamble information that identifies the target satellite. The computerized method may further include determining a transmission frequency of simulated preamble transmission signal. The computerized method may further include computing a doppler shifted simulated preamble transmission signal based on the simulated doppler shift signature pattern, the determined frequency of the simulated preamble transmission signal, and a time interval between packet preambles, wherein a frequency of each preamble in the doppler shifted simulated preamble transmission signal is shifted by a different respective frequency shift amount based on the doppler shift signature pattern.

According to this aspect, the correlations may be determined between the doppler shifted simulated preamble transmission signal and frequencies of the received signals.

According to this aspect, the SDR program may be further configured to set a bandpass filter having a center frequency and a width determined based on the doppler shifted frequencies.

According to this aspect, the bandpass filter may be one of a plurality of bandpass filters at each of the doppler shifted frequencies, and the plurality of bandpass filters may be separated by time intervals along a doppler curve.

According to this aspect, the SDR program may be further configured to read an orientation signal from an onboard orientation sensor, determine a depointing angle based on the orientation signal, and adjust a transmit power of a transmitter of the satellite or modulation and coding parameters of a transmitter based on the depointing angle.

According to this aspect, the SDR program may be further configured to implement a doppler shift offset to resolve collision in packet signals during decoding.

According to this aspect, the SDR program may be further configured to implement signal to noise ratio (SNR) based grouping to resolve collisions in packet signals during decoding.

According to this aspect, the SDR program may be further configured to implement signal to implement symbol window fitting to resolve collisions in packet signals during decoding.

According to another aspect of the present disclosure, a ground station computing system for communicating with a satellite is provided. The computing system may include a processor and associated memory storing instructions that cause the processor to execute a software-defined radio (SDR) program. The SDR program may be configured to receive signals from a plurality of satellites. The SDR program may be configured to determine a doppler shift signature pattern of one of the satellites. The processor executing the SDR program may be further configured to detect, within the received signals from the plurality of satellites, packet preambles from the one of the plurality of satellites, based on correlations between portions of the received signals and the doppler shift signature pattern. The processor may be further configured to read an orientation signal from an onboard orientation sensor. The processor may be further configured to determine a depointing angle based on the orientation signal. The processor may be further configured to adjust modulation and coding parameters of a transmitter of the satellite based on the depointing angle. The processor may be further configured to implement a doppler shift offset to resolve collision in packet signals during decoding.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A ground station computing system for communicating with a satellite, comprising a processor and associated memory storing instructions that cause the processor to:
   execute a software-defined radio (SDR) program configured to:
   receive signals from a plurality of satellites;
   determine a doppler shift signature pattern of one of the satellites; and
   detect, within the received signals from the plurality of satellites, packet preambles from the one of the plurality of satellites, based on correlations between portions of the received signals and the doppler shift signature pattern.

2. The ground station computing system of claim 1, wherein, prior to receiving signals from the plurality of satellites, the processor executing the SDR program is configured to:
- compute a simulated doppler shift signature pattern for a target satellite based upon a relationship between an orbit of the target satellite and a location of an antenna of the ground station;
- generate a simulated preamble transmission signal for the target satellite, including a plurality of encoded preambles, each preamble containing preamble information that identifies the target satellite;
- determine a transmission frequency of the simulated preamble transmission signal; and
- compute a doppler shifted simulated preamble transmission signal based on the simulated doppler shift signature pattern, the determined frequency of the simulated preamble transmission signal, and a time interval between packet preambles, wherein a doppler shifted frequency of each preamble in the doppler shifted simulated preamble transmission signal is shifted by a different respective frequency shift amount based on the doppler shift signature pattern.

3. The ground station of claim 2, wherein the correlations are determined between the doppler shifted simulated preamble transmission signal and frequencies of the received signals.

4. The ground station of claim 3, wherein the SDR program is further configured to set a bandpass filter having a center frequency and a width determined based on each doppler shifted frequency.

5. The ground station of claim 4, wherein
- the bandpass filter is one of a plurality of bandpass filters at each doppler shifted frequency, and
- the plurality of bandpass filters are separated by time intervals along a doppler curve.

6. The ground station of claim 1, wherein the SDR program is further configured to:
- read an orientation signal from an onboard orientation sensor;
- determine a depointing angle based on the orientation signal; and
- adjust a transmit power of a transmitter of the satellite based on the depointing angle.

7. The ground station of claim 1, wherein the SDR program is further configured to:
- read an orientation signal from an onboard orientation sensor;
- determine a depointing angle based on the orientation signal; and
- adjust modulation and coding parameters of a transmitter of the satellite based on the depointing angle.

8. The ground station of claim 1, wherein the SDR program is further configured to implement a doppler shift offset to resolve collision in packet signals during decoding.

9. The ground station of claim 1, wherein the SDR program is further configured to implement signal to noise ratio (SNR) based grouping to resolve collisions in packet signals during decoding.

10. The ground station of claim 1, wherein the SDR program is further configured to implement symbol window fitting to resolve collisions in packet signals during decoding.

11. A computerized method for communicating with a satellite, comprising:
- executing a software-defined radio (SDR) program configured to:
  - receive signals from a plurality of satellites;
  - determine a doppler shift signature pattern of one of the satellites; and
  - detect, within the received signals from the plurality of satellites, packet preambles from the one of the plurality of satellites, based on correlations between portions of the received signals and the doppler shift signature pattern.

12. The computerized method of claim 11, further comprising:
- prior to receiving signals from the plurality of satellites, computing a simulated doppler shift signature pattern for a target satellite based upon a relationship between an orbit of the target satellite and a location of an antenna of the ground station;
- generating a simulated preamble transmission signal for the target satellite, including a plurality of encoded preambles, each preamble containing preamble information that identifies the target satellite;
- determining a transmission frequency of the simulated preamble transmission signal; and
- computing a doppler shifted simulated preamble transmission signal based on the simulated doppler shift signature pattern, the determined frequency of the simulated preamble transmission signal, and a time interval between packet preambles, wherein a doppler shifted frequency of each preamble in the doppler shifted simulated preamble transmission signal is shifted by a different respective frequency shift amount based on the doppler shift signature pattern.

13. The computerized method of claim 12, wherein the correlations are determined between the doppler shifted simulated preamble transmission signal and frequencies of the received signals.

14. The computerized method of claim 13, wherein the SDR program is further configured to set a bandpass filter having a center frequency and a width determined based on each doppler shifted frequency.

15. The computerized method of claim 14, wherein
- the bandpass filter is one of a plurality of bandpass filters at each doppler shifted frequency, and
- the plurality of bandpass filters are separated by time intervals along a doppler curve.

16. The computerized method of claim 11, wherein the SDR program is further configured to:
- read an orientation signal from an onboard orientation sensor;
- determine a depointing angle based on the orientation signal; and
- adjust a transmit power of a transmitter of the satellite or modulation and coding parameters of a transmitter based on the depointing angle.

17. The computerized method of claim 11, wherein the SDR program is further configured to implement a doppler shift offset to resolve collision in packet signals during decoding.

18. The computerized method of claim 11, wherein the SDR program is further configured to implement signal to noise ratio (SNR) based grouping to resolve collisions in packet signals during decoding.

19. The computerized method of claim 11, wherein the SDR program is further configured to implement symbol window fitting to resolve collisions in packet signals during decoding.

20. A ground station computing system for communicating with a satellite, comprising a processor and associated memory storing instructions that cause the processor to:

execute a software-defined radio (SDR) program configured to:
  receive signals from a plurality of satellites;
  determine a doppler shift signature pattern of one of the satellites;
  detect, within the received signals from the plurality of satellites, packet preambles from the one of the plurality of satellites, based on correlations between portions of the received signals and the doppler shift signature pattern;
  read an orientation signal from an onboard orientation sensor;
  determine a depointing angle based on the orientation signal;
  adjust modulation and coding parameters of a transmitter of the satellite based on the depointing angle; and
  implement a doppler shift offset to resolve collision in packet signals during decoding.

* * * * *